United States Patent Office 2,740,731
Patented Apr. 3, 1956

2,740,731
ELECTROCONDUCTIVE ARTICLE AND PRODUCTION THEREOF

William O. Lytle and Albert E. Junge, New Kensington, Pa., assignors to Pittsburgh Plate Glass Company No Drawing. Application January 20, 1951, Serial No. 207,062

10 Claims. (Cl. 117—211)

This invention relates to novel electroconductive articles and to novel methods of producing such articles.

It is known that an electroconductive film may be deposited upon a refractory base such as glass, by heating the glass to an elevated temperature, for example above 400° F. but below the temperature at which the glass melts, and subjecting the glass while hot to the action of indium chloride. When this process is applied to the coating of plate or window glass without recourse to other agents which tend to improve the conductivity of the coating, and at temperatures at which such glass readily retains its shape, the coating is found to have a relatively high electrical resistance. Thus it is rare that products thus obtained have specific electrical resistivity below about 0.02 ohm centimeter. While somewhat better conductivity may be obtained when the glass is heated to a temperature of 1250° F., window or plate glass is too plastic at such temperature and therefore other complications arise. When the process is conducted using certain agents, such as methanol, phenyl hydrazine and antimony chloride, a coating of improved electroconductivity can be obtained. However, even such coatings rarely have a specific resistivity below about 0.0015 ohm centimeters.

The relatively high resistivity of indium oxide coatings produced according to the above methods frequently is disadvantageous. This is particularly the case when it is desired to provide a transparent lime soda (window or plate) glass base with an electroconductive coating which is transparent. In such a case, it may be necessary to deposit the electroconductive coating as a very thin film, usually a thickness below about 600 millimicrons. The electrical resistance of such film is frequently found to be unduly high.

Furthermore, such films of 75 to 600 millimicrons in thickness, even though transparent, exhibit interference colors which are undesirable for many purposes. When extremely thin coatings below the range at which interference colors are exhibited (below about 30 to 75 millimicrons) are produced, the conductivity of the films becomes so low that the voltage which must be applied in order to obtain passage of an electric current therethrough becomes too high to permit use of the article in certain fields such as for viewing closures for windshields in the cabins of automobiles, airplanes, or other vehicles. A further disadvantage of certain of the films which have been prepared prior to the present invention lies in that these films, particularly thick films, frequently have poor adherence to the glass base.

According to the present invention, a novel indium oxide having an unusually high electroconductivity has been provided. This indium oxide is electroconductive and is preponderantly of indium oxide but contains a small amount of fluorine therein. This product may be deposited upon a base, such as a transparent glass base by conducting the coating operation in the presence of fluorine, either in elemental state or as a metal or mineral fluoride compound which is soluble in or is miscible with the indium compound, such as water soluble fluoride.

It has now been found that many coatings so deposited have a specific resistivity below 0.001 ohm-centimeter, usually of the order of 0.0005 to 0.0009 ohm-centimeter. This electroconductivity is quite unusual and is far superior to that of the films which are deposited on lime-soda glass, such as window or plate glass, using other processes. Furthermore, the films are found to be more adherent to the glass base than other films of comparable surface resistivity. Certain additional advantages accrue, as will appear more fully hereinafter, when the process is conducted using a solution of the indium compound, for example, indium chloride, containing fluorine and also containing an additional agent such as an aldehyde or an alcohol.

The invention is performed simply by heating the glass to an elevated temperature above 400° F. but below the temperature at which the glass begins to flow, preferably within the range of about 800° to 1200° F., and exposing the hot glass to the action of the indium compound and the fluoride. A typical solution which may be used according to this invention comprises an aqueous solution of indium chloride and hydrofluoric acid or a fluoride salt such as ammonium hydrogen fluoride (NH₄F.HF) or ammonium fluoride (NH₄F). This solution is sprayed upon the hot glass surface using a conventional spray gun and short periods of spray, for example, one or several seconds (usually less than 10 or 20 seconds).

It is found advantageous to utilize a solution which is relatively concentrated as to indium chloride. Thus it is rare to use a solution containing less than about 10 percent by weight of indium chloride since such solutions are unduly dilute and do not normally produce a satisfactory film. More concentrated solutions normally are used so long as the solution remains liquid. Preferably it is found advantageous to utilize solutions containing about 30 to 70 percent by weight of indium chloride.

The amount of the fluoride which is used is capable of some variation. Small amounts (even traces) show an improvement in electroconductivity. In general, the amount of fluoride present in the solution, calculated as fluorine should be within the range of about 0.05 to 20 percent by weight of the indium chloride in the solution. More commonly the preferred range is found to be approximately 0.01 to 10 percent by weight of the indium chloride. Equivalent molar concentrations are used when other indium compounds are used; the mol ratio of F to In in the coating composition usually ranging upward from 0.005. Usually fluorine to indium mol ratios above 0.2 serve no particularly useful purpose. However, this concentration may be much higher, for example, as in a case when the indium salt is indium fluoride.

As previously stated, it has been found advantageous to add to the solution a water soluble alcohol or aldehyde. Such compounds are advantageous since they appear to increase the conductivity of the film produced, reduce the amount of haze which tends to be developed in the film and further to prevent or minimize tendency of the indium compound to precipitate. Typical alcohols which are found to be suitable include methyl alcohol, ethyl alcohol, isopropyl alcohol, normal butyl alcohol, tertiary butyl alcohol, normal propyl alcohol, allyl alcohol, methallyl alcohol, benzyl alcohol and other alcohols containing up to 8 carbon atoms. Furthermore the water soluble dihydric alcohols including the glycols such as ethylene glycol, propylene glycol, isobutylene glycol, or the polyglycols such as diethylene glycol, triethylene glycol, dipropylene glycol, glycerol, or other polyhydric alcohol may be used according to this invention. Typical aldehydes which have been found to be suitable include formaldehyde, acid aldehyde, butyraldehyde, furfural, glyoxal, and other aldehydes having sufficient water solubility to be capable of being dissolved in the solution.

The amount of alcohol or aldehyde so used normally is within the range of 0.01 to 0.1 mol per mol of indium compound although higher concentrations may be used if desired.

Generally speaking, the fluoride used must be a metal fluoride (i. e., one in which fluorine is linked to another element, such as hydrogen or other metal, by a polar bond) although the fluorine may or may not be complex. Hence, the fluoride compound may be a simple fluoride or a complex such as an indium-fluorine complex or a double or a triple salt. Such compounds are ionizable and may be regarded as sources of fluoride ions although the solution may appear to be free from fluoride ions due to formation of complex ions.

It is worthy of note that when hydrofluoric acid or alkali metal fluoride dissolves in the aqueous idium chloride herein contemplated, the fluoride ion content appears to be quite low and no tendency to etch glass is observed. This may be due to the fact that a complex fluorine indium compound is formed.

Particularly effective results are obtained when hydrofluoric acid or an alkali metal fluoride (including ammonium fluoride) are used. Thus, sodium fluoride, potassium fluoride, ammonium fluoride, and the corresponding acid fluorides and hydrofluoric acid produce indium oxide coatings having maximum conductivity. Within the limits of their solubility, other fluorides such as lithium fluoride, beryllium fluoride, aluminum fluoride, lead fluoride, barium fluoride, calcium fluoride, cadmium fluoride, chromium fluoride, etc. may be used. Furthermore, complex salts or acids such as fluosilicic acid, fluoboric acid, aluminum fluosilicate, magnesium fluosilicate, cadmium fluosilicate, nickel fluosilicate, or the corresponding fluophosphates or fluostannates are other sources of fluorine.

It should be understood that the presence of certain elements exert a deteriorating effect upon the coating. For example, the presence of boron or a silicon exert an adverse effect. Consequently, optimum results cannot be obtained with fluoborates or fluosilicates. Nevertheless, the presence of fluorine improves the electroconductivity of indium oxide films produced from solutions containing silicon or boron.

The process is found to be particularly successful when indium trichloride is used as indium compound. However, other indium compounds, such as indium acetate also may be used. Still further indium compounds which are suitable for use according to the present invention include the following: indium halides such as indium tribromide, indium trifluoride and indium tri-iodide, and other indium salts, particularly water soluble salts, such as indium nitrate and indium sulfate.

Of the above listed compounds, indium halides have been found to be more suitable than the other compounds. This may be due to the fact that the solubility of the indium halides in aqueous solutions is quite high, therefore the use of concentrated solutions containing 10 percent or more of the indium salts by weight, based on the weight of the solution, is permissible. With many indium compounds, the water solubility thereof is not sufficiently high to permit the presence of such a high concentration of indium. However, organic solvents may be used in lieu of or in conjunction with the water in order to increase the content of the indium in the solution or mixture to the desired range. For most purposes, the indium content in dissolved form of the solution should not be below about 5 percent by weight based upon the weight of the solution. Nor should the fluoride content of the solution be below about 0.05 percent of the indium in the solution.

The films which are produced according to the present invention are characterized by their high conductivity and transparency. The films obtained range in thickness as desired from approximately 25 millimicrons to 600 millimicrons. Thicker films may be deposited if desired.

Thick films may be peeled from the plate and used as such for many purposes. As previously stated, the specific resistivity of the oxide produced (measured in a direction parallel with the glass surface) ranges between about 0.0001 to 0.001 ohm-centimeter.

From a chemical point of view, the electroconductive film produced according to this invention is predominantly an indium oxide; the total indium and oxygen content thereof usually being above 98 to 99.9 percent by weight. Small concentrations of fluorine also are present in the film and it is believed that such fluorine is the cause of the superior electroconductivity of the film. Fluorine content of the film is quite small, ranging from a trace to 0.2 percent by weight. Fluorine concentrations rarely exceed 0.1 to 0.2 percent by weight.

The film also may contain other components depending upon the nature of the indium compound. For example, when indium trichloride is used, the film contains chlorine and when an alcohol is present, the film contains carbon, all of these components being present in amounts usually less than 0.1 to 0.5 percent by weight of the film.

The high conductivity of the transparent coating produced according to this invention makes possible the production of transparent glass articles having an electrical surface resistivity of 50 to 125 ohms per unit square which exhibit little or none of the iridescence or color which is characteristic of the films produced according to other processes. Such colorless or essentially colorless films are extremely thin, being of a thickness less than 200 millimicrons. Thicker films exhibit interference colors, but have a lower electrical surface resistivity in terms of ohms per unit square being as low as 15 to 50 ohms per unit square. The expression of surface resistivity in terms of ohms per unit square is a convenient means of expressing the resistance of thin films. Surface resistivity is defined as the specific resistivity of the film divided by the average thickness of film within the unit square.

*Example I*

An indium chloride solution is prepared by mixing 200 grams of indium trichloride with 70 cubic centimeters of water and 20 cubic centimeters of methanol. Twenty cubic centimeters of this solution is mixed with 30 grams of an aqueous solution of formalin and 6 grams of ammonium acid fluoride. The formalin solution contains 40 percent by weight of formaldehyde. This solution is kept at a temperature sufficient to prevent precipitation.

A sheet of lime-soda glass 14 inches x 20 inches x %4 inch is vertically suspended and heated in a furnace chamber at a temperature of 1150° F. for three minutes. The sheet is then removed from the furnace and immediately sprayed in air of relative humidity of 25 to 30 percent with the solution prepared as above, using a conventional spray gun and spraying approximately 10 cubic centimeters of the solution within a period of 5 seconds. Following the spraying operation, the sheet is air quenched to a temper of approximately ¼ that of full temper. The resulting coating is transparent, has a thickness of about 75 millimicrons and a resistivity of about 0.0008 ohm-centimeter.

*Example II*

A solution is made up by mixing the following components:

200 grams of indium trichloride
9 grams of an aqueous solution containing 10 percent by weight of dioctyl sodium sulfosuccinate
70 cubic centimeters of water
18 cubic centimeters of methanol The mixture is cooled during mixing in order to remove some of the heat of solution or mixing.

Fifty cubic centimeters of this solution is mixed with 30 grams of methyl alcohol and 30 grams of an aqueous solution of hydrofluoric acid containing 48 percent by weight HF.

A glass base is heated as in Example I in a furnace chamber having a temperature of 1150° F. for three minutes and thereafter is immediately sprayed with this solution, using 10 cubic centimeters of solution and effecting the spraying operation within 5 seconds. A transparent coated base having the characteristics of the product described in Example I is obtained.

Example III

A solution is prepared by mixing:

170 cubic centimeters of indium trichloride
1000 cubic centimeters of methanol
6 grams of ammonium bifluoride A sheet of plate glass is heated and sprayed as in Example I using this solution in lieu of that described in Example I.

Example IV

The process of Example I is repeated using a solution produced by mixing:

4 grams indium acetate
4 grams methanol
25 grams of water
30 grams of an aqueous solution of formalin containing 40 percent by weight of formaldehyde
6 grams of ammonium acid fluoride The solution is sprayed on heated glass as in Example I in an atmosphere having a relative humidity of about 30 to 35 percent.

The invention has been particularly described as applied to the deposition of an electroconductive film upon soda-lime glass since the problem of producing films of low conductivity upon soda-lime glass is especially difficult. However the present process may be used to deposit conductive films upon other bases such as borosilicate glass, china, phosphate glass, porcelain, mica, tungsten carbide, silicon carbide, aluminum oxide, asbestos, glass fiber and other refractory bases which do not melt or fuse at temperatures below 1250° F.

Although the present invention has been described with particular reference to the specific details of certain embodiments, it is not intended that such details shall be regarded as limitations upon the scope of the invention except insofar as included in the accompanying claims.

We claim:

1. An article of manufacture which comprises a transparent refractory base having a transparent electroconductive indium oxide, fluorine containing coating thereon.

2. The article of claim 1 wherein the indium oxide coating contains at least a trace but not more than about 0.2 percent by weight of fluorine.

3. A soda-lime glass base having an electroconductive transparent indium oxide, fluorine containing coating 25 to 600 millimicrons in thickness upon a surface thereof, said coating having an electrical resistivity of 0.0005 to 0.0009 ohm-centimeter.

4. A method of providing a refractory base with an electroconductive coating which comprises heating the base to a temperature above about 400° F. but below the temperature at which the base becomes molten, and applying to the hot base a fluid dispersion of an indium salt and an ionizable fluoride.

5. The process of claim 4 wherein the fluoride is hydrogen fluoride.

6. A method of providing a refractory base with an electroconductive coating which comprises heating the base to a temperature above about 400° F. but below the temperature at which the base becomes molten, and applying to the hot base an aqueous solution containing an indium salt and an ionizable fluoride.

7. A method of providing a refractory base with an electroconductive coating which comprises heating the base to a temperature above about 400° F. but below the temperature at which the base becomes molten, and applying to the hot base a fluid dispersion of indium chloride and an ionizable fluoride.

8. The process of claim 7 wherein the fluoride is ammonium bifluoride.

9. A method of providing a glass base with an electroconductive coating which comprises heating the base to a temperature above about 400° F. but below the temperature at which the glass becomes molten and spraying the hot base with a liquid having dispersed therein indium chloride and an ionizable fluoride.

10. In the method of producing an electro-conductive indium oxide film on a refractory base by the application of an indium salt to a refractory base heated to a temperature above about 400° F. but below the temperature at which the glass becomes molten, the improvement which comprises applying a solution of an indium salt and ionizable fluoride to said base.

References Cited in the file of this patent

UNITED STATES PATENTS

| | | |
|---|---|---|
| 2,021,661 | Kisfaludy | Nov. 19, 1935 |
| 2,118,795 | Littleton | May 24, 1938 |
| 2,429,420 | McMaster | Oct. 21, 1947 |
| 2,564,677 | Davis | Aug. 21, 1951 |
| 2,566,346 | Lytle et al. | Sept. 4, 1951 |

OTHER REFERENCES

Materials and Methods Manual, June 1948, Electroplated Coatings, by George Black (pp. 93–99).